United States Patent [19]
Gautheron et al.

[11] Patent Number: 6,008,922
[45] Date of Patent: Dec. 28, 1999

[54] OPTICAL COMMUNICATION SYSTEM USING OPTICAL AMPLIFIERS WITH GAIN DEPENDENT ON INPUT SIGNAL POLARIZATION

[75] Inventors: Olivier Gautheron, Montigny le Bretonneux; Vincent Letellier, Paris, both of France

[73] Assignee: Alcatel Submarine Networks, Clichy, France

[21] Appl. No.: 08/859,429

[22] Filed: May 20, 1997

[30] Foreign Application Priority Data

May 23, 1996 [FR] France .................................. 96 06404

[51] Int. Cl.⁶ ................................................... H04B 10/00
[52] U.S. Cl. ............................................. 359/156; 372/27
[58] Field of Search ..................... 359/156, 181, 359/183, 341, 333, 337; 372/6, 27; 385/1, 11

[56] References Cited

U.S. PATENT DOCUMENTS 5,361,270  11/1994  Heismann .................................. 372/27

FOREIGN PATENT DOCUMENTS

| | | | |
|---|---|---|---|
| 0304994 | 3/1989 | European Pat. Off. ................ | 359/156 |
| 0529240 | 3/1993 | European Pat. Off. ................ | 359/156 |
| 0668672 | 8/1995 | European Pat. Off. . | |
| 2716591 | 8/1995 | France . | |

OTHER PUBLICATIONS

M. Santoro et al, "Polarization Scrambling Using a Short Piece of High–Birefringence Optical Fiber and a Multifrequency Laser Diode", *Journal of Lightwave Technology*, vol. 12, No. 2, Feb. 1994, pp. 288–293.

F. Heismann, "Fast Polarization Controllers & Scramblers for High–Speed Lightwave Systems", *Optical Fiber Communication, Summaries of Papers Presented at the Conference OFC '95, San Diego*, Feb. 26–Mar. 3, 1995, vol. 8, Feb. 26, 1995, Institute of Electrical & Electronics Engineers—pp. 11–13.

Patent Abstracts of Japan, vol. 016, No. 580 Dec. 18, 1992, corresponding to JP 04 229842 (Fujitsu).

*Primary Examiner*—Thomas Mullen
*Attorney, Agent, or Firm*—Sughrue, Mion, Zinn, Macpeak & Seas, PLLC

[57] ABSTRACT

In an optical communication system using polarization scrambling of the transmitted optical signal, the scrambling causes the polarization vector to rotate. The scrambler includes a modulator to modulate either the phase or the wavelength of the optical signal. A polarization dispersion device converts the phase modulation or wavelength modulation into polarization modulation. This polarization dispersion device consists of the optical communication fibers on the output side of the modulator.

17 Claims, 1 Drawing Sheet

OPTICAL COMMUNICATION SYSTEM USING OPTICAL AMPLIFIERS WITH GAIN DEPENDENT ON INPUT SIGNAL POLARIZATION

BACKGROUND OF THE INVENTION

1. Field of the Invention

The invention concerns an optical telecommunication system.

2. Description of the Prior Art

A system of this kind comprises optical conductors transmitting optical signals produced by one or more laser sources and amplitude modulated by the signal to be transmitted. This signal is usually a telephone signal or a data signal. The advantages of optical transmission are low signal distortion and low attenuation. However, there is some attenuation; its effects are always felt over long distances. This is why spaced repeaters are provided in optical telecommunication systems to amplify the naturally attenuated optical signal.

These repeaters include optical amplifiers. An optical amplifier is usually formed by a doped optical fiber, for example one doped with erbium ions $Er^{+++}$, and by a pump laser for inverting the population of electrons in the fiber, this inversion producing the amplification effect.

If the input optical signal is polarized, it can be amplified anisotropically by the amplifier because the gain is lower in the direction of polarization of the signal than in the orthogonal direction. In other words, the amplifier is more strongly saturated in the signal polarization direction than in the orthogonal direction.

This differential gain degrades the signal to noise ratio, which affects transmission quality.

This property of optical amplifiers is a drawback of all optical telecommunication systems since in these latter systems the optical signal is produced by a laser supplying a polarized wave.

Various solutions to this problem have already been proposed.

For example, in French patent 2 717 331 there is disclosed a polarizer imposing a particular polarization direction and an electro-optical phase modulator receiving the signal polarized at 45° to the crystal axes of the modulator. The control voltage applied to the crystal periodically modifies its refractive index. This index variation, which is not the same for the two crystal axes, is effected at a period which is less than the saturation time of the amplifier. It produces a phase shift between the components of the polarization vector on the two crystal axes. This phase shift causes rotation of the polarization vector and therefore "scrambling" of the polarization. This renders the gain of the amplifier isotropic.

In another example (U.S. Pat. No. 5,361,270), the polarization is scrambled by two phase modulators in series.

The invention aims to simplify the implementation of the polarization scrambling.

SUMMARY OF THE INVENTION

To scramble the polarization of the optical signal, the invention provides a phase modulator or wavelength modulator which supplies a modulated signal to polarization dispersion means, such as an optical fiber, for example a fiber of the polarization maintaining type.

The modulation is chosen as in French patent 2 717 331, i.e. with a period less than the saturation time of the optical amplifiers.

The polarization dispersion converts the phase modulation or wavelength modulation into polarization modulation and this produces the required polarization scrambling.

This polarization dispersion exists naturally in virtually all optical fibers. It is due to the fact that in practise an optical fiber is never perfectly cylindrical or perfectly homogeneous. The result is anisotrophy, or dispersion, of the refractive index which causes polarization modulation of a polarized wave that is phase modulated or wavelength modulated.

If the fibers of the communication lines used in the system on the output side of the phase modulator or wavelength modulator are subject to polarization dispersion, the invention greatly simplifies the implementation of the scrambler, either by eliminating a polarizer (compared to the technique described in French patent 2 717 331) or by eliminating a modulator (compared to U.S. Pat. No. 5,361,270). In this case, polarization scrambling in practise requires only the use of phase modulation or wavelength modulation, the polarization dispersion being obtained naturally in the communication optical fibers on the output side of the modulator.

If the communication fibers have negligible polarization dispersion, at least one fiber portion having sufficient dispersion to produce the required scrambling is introduced on the output side of the modulator.

In one example, a fiber of this kind is provided from place to place, for example in each repeater. The installation of a fiber of this kind represents a negligible constraint on system implementation.

In one embodiment, the phase modulator or wavelength modulator is on the output side of the laser emitter.

In a variant, there is no specific phase modulator or wavelength modulator but, instead, the wavelength of the laser emitter is modulated. This modulation is also effected with a period less than the saturation time of the optical amplifiers.

Other features and advantages of the invention will emerge from the description of embodiments of the invention given with reference to the accompanying drawings.

DETAILED DESCRIPTION OF THE PREFERRED EMBODIMENT

Figure 1:
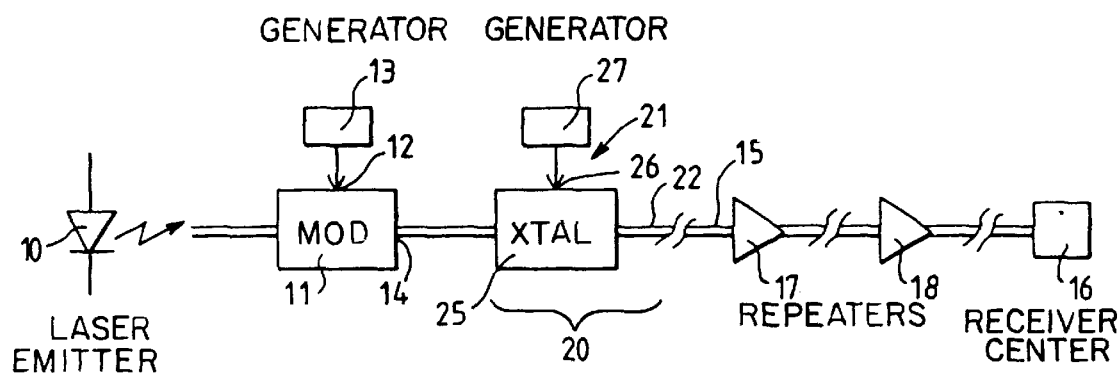
FIG. 1 is a schematic of an optical communication system of the invention.

The optical communication system shown in FIG. 1 includes, in a manner that is known in itself, a laser emitter 10 producing a polarized monochromatic optical wave which is transmitted to an amplitude modulator 11 receiving on an input 12 control signal supplied by a generator 13 for modulating the amplitude of the optical signal. In the example the modulation is digital. It represents information to be transmitted, for example telephone calls.

The signals at the output 14 of the modulator 11 are to be transmitted over long distances, usually thousands of kilometers, via optical fibers 15 to one or more receiver centers or installations 16.

Repeaters 17, 18, ... comprising optical amplifiers for amplifying the optical signal are provided from place to place on the line 15. These repeaters are of the constant power type, for example.

The optical amplifiers of the repeaters 17, 18 are doped fiber amplifiers the gain of which depends on the polarization of the input signal, as explained above.

For the amplifiers of the repeaters 17, 18 to have an isotropic gain, a polarization scrambler device 20 is provided to depolarize at least a major part of the optical signal reaching the repeaters 17, 18, . . .

The scrambler 20 includes a phase modulator 21 for modulating the phase of the optical wave reaching its input and an optical fiber 22 having sufficient polarization dispersion to obtain the required scrambling and receiving the phase modulated signal supplied by the modulator 21. As explained below, the polarization maintaining type optical fiber 22 is usually not a separate item but the fiber usually employed to transmit the signals, its polarization dispersion properties contributing to the required scrambling effect.

A phase modulator 21 is known in itself. In one implementation it comprises a lithium niobate crystal 25 between two faces of which is applied an electric voltage that varies with a period at most equal to the saturation time of the amplifiers.

This voltage applied to the crystal 25 is symbolically represented by an input 26 in FIG. 1 and the voltage generator is represented by the block 27.

The voltage applied to the crystal 25 causes a variation in the refractive index n which is not the same on the x and y axes of the crystal. As explained below in the description of the diagrams in FIGS. 2 and 3, this refractive index variation causes phase modulation of the optical signal.

This phase modulation of the optical signal causes modulation of the polarization, i.e. rotation of the polarization vector, if the direction of the latter at the input modulator 20 does not correspond to the x or y axis of the crystal. Moreover, the polarization modulation depends on the angle of the polarization vector to the x and y axes at the input of the modulator 20; the modulation is strongest when this vector is at 45° to the x and y axes.

Accordingly, with a simple electro-optical phase modulator, polarization scrambling is not always guaranteed and is not optimum in any case unless precautions are taken. This is why, in the earlier French patent 2 717 331, a polarizer is provided on the input side of the phase modulator so that the polarization of the optical signal at the input of this modulator is inclined to the crystal axes of the modulator, preferably at 45°.

The present invention provides a different, simpler solution. It consists in providing a polarization dispersion unit 22 which converts phase modulation applied to its input into polarization modulation. In the embodiment described, this device 22 is simply an optical fiber having polarization dispersion.

Most polarization maintaining optical fibers used in telecommunication systems have this polarization dispersion. This is why the device 22 can consist of the fiber usually employed to transmit the optical signals, which therefore has both its usual transmission function and a polarization dispersion function contributing to the scrambling effect.

However, some communication systems use optical fibers having low polarization dispersion. In this case, at least one section of optical fiber having the necessary polarization dispersion is provided on the output side of the modulator. This portion is disposed at the output of the modulator 21, for example, and from place to place on the line, for example in each repeater.

In one embodiment (not shown) the modulator 21 varies the wavelength of the optical signal. In another embodiment (not shown) there is no modulator 21 and the wavelength of the optical signal produced by the laser emitter 10 is modulated instead.

The wavelength modulation is equivalent to phase modulation and, like the latter, is converted into polarization modulation by the device 22.

Figure 2:
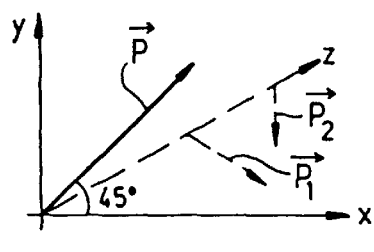
FIGS. 2 and 3 are diagrams relating to the operation of the system from FIG. 1.

The FIG. 2 diagram shows the x and y axes of the crystal 25 of the modulator 21, which are perpendicular to the direction z of propagation of the optical signal. In the example shown in FIG. 2 the polarization vector $\vec{P}$ is inclined at 45° to these two axes in the x, y plane.

The refractive index modulation produced by the voltage supplied by the generator 27 is not the same on the x and y axes, which results in differential phase modulation on the x and y axes. As a result the components of the vector $\vec{P}$ on the x and y axes do not vary synchronously. The vector $\vec{P}$ is therefore subject to rotation along the z axis, as shown by the vectors $\vec{P}_1$ and $\vec{P}_2$ in FIG. 2. It is this rotation that constitutes the polarization scrambling.

Figure 3:
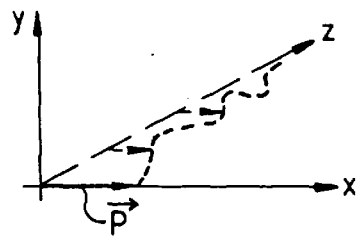

However, if, as shown in FIG. 3, the vector $\vec{P}$ is on one of the crystal axes (or in the direction of one of these axes), the x axis in the figure, the phase modulation does not cause rotation of the vector $\vec{P}$, the latter always remaining in the plane of the x and z axes. The polarization dispersion fiber 22 converts this phase modulation into polarization modulation, i.e. rotation of the polarization vector about the z axis, which constitutes the necessary polarization scrambling to reduce noise in the optical amplifiers of the repeaters 17, 18, . . .

If the polarization vector $\vec{P}$—without being in the direction of an axis—does not have the optimal inclination, the polarization scrambling is not maximal. The scrambling is enhanced by the fiber 22 converting the phase modulation into polarization modulation.

The conditions that the phase modulation or wavelength modulation must satisfy to obtain the required result are:

1) sufficiently fast variation for its period to be less than the saturation time of the amplifiers. To this end, the modulation frequency is at least 1 kHz;

2) a sufficiently large amplitude to create the polarization rotation.

The modulation is chosen in accordance with the following equation:

$$\theta = 2\pi \Delta f \cdot \tau$$

In the above equation:

Δf is the frequency difference in Hertz between two wavelengths (i.e. the modulation amplitude);

τ is the total polarization dispersion in time units; and

θ is the angle between two vectors representing the polarization of two wavelengths, these vectors being defined on the Poincaré sphere.

To obtain an angle θ equal to π radians, corresponding to orthogonal polarization vectors, a dispersion of 15 picoseconds and a difference Δf of 33 GHz may be chosen.

There is claimed:

1. A long distance optical communication system of the type using polarization scrambling of a transmitted monochromatic optical signal, the scrambler causing the polarization vector to rotate and including a phase modulator for modulating the phase of said optical signal, wherein the optical communication fibers are subject to polarization dispersion and contribute to polarization scrambling by converting the phase modulation into polarization modulation.

2. The system claimed in claim 1 wherein a polarization dispersion fiber is provided from place to place on the line.

3. A system as claimed in claim 2, wherein said polarization dispersion fiber is in each repeater.

4. A system as claimed in claim 1 including repeaters including doped fiber type optical amplifiers.

5. A system as claimed in claim 4, wherein said doped fiber type optical amplifiers are erbium doped fiber type optical amplifiers.

6. The system claimed in claim 1 wherein said phase modulator is of the electro-optical type including a crystal to which a voltage is applied to vary its refractive index.

7. A system as claimed in claim 6, wherein said crystal is a lithium niobate crystal.

8. A system as claimed in claim 1 including at least one optical amplifier and wherein said phase modulation has a period at least equal to the saturation time of said optical amplifier.

9. A long distance optical communication system of the type using polarization scrambling of a transmitted monochromatic optical signal, the scrambler causing the polarization vector of the transmitted optical wave to rotate, wherein said scrambler includes a wavelength modulator for modulating the wavelength of said optical signal and the optical communication fibers are of the polarization dispersion type and contribute to polarization scrambling by converting the wavelength modulation into polarization modulation.

10. The system claimed in claim 9 wherein said wavelength modulation is effected by modulating the wavelength of the monochromatic laser source of the system.

11. The system claimed in claim 2 wherein a polarization dispersion fiber is provided from place to place on the line.

12. A system as claimed in claim 6, wherein said polarization dispersion fiber is in each repeater.

13. A system as claimed in claim 9 including repeaters including doped fiber type optical amplifiers.

14. A system as claimed in claim 13, wherein said doped fiber type optical amplifiers are erbium doped fiber type optical amplifiers.

15. The system as claimed in claim 9 wherein said wavelength modulator is of the electro-optical type including a crystal to which a voltage is applied to vary its refractive labor.

16. A system as claimed in claim 15, wherein said crystal is a lithium niobate crystal.

17. The system as claimed in claim 9 including at least one optical amplifier and wherein said wavelength modulation has a period at least equal to the saturation time of said optical amplifier.

* * * * *